United States Patent
Rosenqvist et al.

(10) Patent No.: US 9,055,603 B2
(45) Date of Patent: Jun. 9, 2015

(54) SCHEDULING OF UP-LINK TRANSMISSIONS OF A WIRELESS COMMUNICATION SYSTEM

(75) Inventors: Anders Rosenqvist, Lund (SE); Bengt Lindoff, Bjärred (SE); Andres Reial, Malmö (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 535 days.

(21) Appl. No.: 13/503,898

(22) PCT Filed: Oct. 22, 2010

(86) PCT No.: PCT/EP2010/065986
§ 371 (c)(1),
(2), (4) Date: Jul. 31, 2012

(87) PCT Pub. No.: WO2011/051187
PCT Pub. Date: May 5, 2011

(65) Prior Publication Data
US 2012/0300754 A1   Nov. 29, 2012

Related U.S. Application Data

(60) Provisional application No. 61/258,645, filed on Nov. 6, 2009.

(30) Foreign Application Priority Data

Oct. 29, 2009   (EP) .................................... 09174412

(51) Int. Cl.
*H04L 12/28* (2006.01)
*H04W 4/06* (2009.01)
(Continued)

(52) U.S. Cl.
CPC ........... *H04W 72/1268* (2013.01); *H04B 7/024* (2013.01); *H04B 7/0452* (2013.01)

(58) Field of Classification Search
CPC ...................................................... H04B 7/024
See application file for complete search history.

(56) References Cited

U.S. PATENT DOCUMENTS

| 7,158,804 | B2  | 1/2007 | Kumaran et al. |         |
|-----------|-----|--------|----------------|---------|
| 8,145,223 | B2* | 3/2012 | Guey           | 455/447 |

(Continued)

FOREIGN PATENT DOCUMENTS

| EP | 2056505 A1     | 6/2009  |
|----|----------------|---------|
| WO | 2008138164 A1  | 11/2008 |
| WO | 2009083782 A2  | 7/2009  |

OTHER PUBLICATIONS

Wang, X. et al. "Fairness Adjustable Grouping Multiuser Scheduling for MIMO MAC with MMSE-SIC Receiver." 2008 IEEE GLOBECOM Workshops, Nov. 30-Dec. 4, 2008, Piscataway, New Jersey, USA, pp. 1-5.

(Continued)

*Primary Examiner* — Gregory Sefcheck
(74) *Attorney, Agent, or Firm* — Coats & Bennett, PLLC

(57) ABSTRACT

A method is disclosed of scheduling up-link transmissions for a number of terminals of a wireless communication system into a number of groups, wherein each group comprises terminals intended for simultaneous up-link transmission during a respective period of time. A subset metric may be calculated for each of a number of subsets of terminals based on transmissions received from the terminals of the subset. The subset metric is indicative of a simultaneous transmission suitability measure for the terminals of the subset. The subsets may be processed in subset metric order, starting with the subset having a subset metric indicating a least suitability of simultaneous transmission. During the processing, each terminal of the subset that is not already scheduled in a group may be scheduled in a group that does not already comprise another terminal of the subset. Information indicative of the period of time during which a scheduled terminal is intended to transmit may be transmitted to each of the scheduled terminals. Corresponding computer program product, scheduler and arrangement are also disclosed.

15 Claims, 3 Drawing Sheets

(51) Int. Cl.
*H04W 40/00* (2009.01)
*H04W 72/12* (2009.01)
*H04B 7/02* (2006.01)
*H04B 7/04* (2006.01)

(56) References Cited

U.S. PATENT DOCUMENTS

| | | | |
|---|---|---|---|
| 8,437,300 B2* | 5/2013 | Nam et al. | 370/329 |
| 8,442,545 B2* | 5/2013 | Guey et al. | 455/452.2 |
| 8,526,407 B2* | 9/2013 | Zangi et al. | 370/338 |
| 8,538,482 B2* | 9/2013 | Koo et al. | 455/562.1 |
| 8,675,511 B2* | 3/2014 | Gorokhov et al. | 370/252 |
| 8,849,326 B2* | 9/2014 | Zangi et al. | 455/501 |
| 2004/0071115 A1 | 4/2004 | Earnshaw et al. | |
| 2006/0067269 A1 | 3/2006 | Jugl et al. | |
| 2007/0171808 A1 | 7/2007 | Wu et al. | |
| 2008/0037671 A1 | 2/2008 | Lee et al. | |
| 2009/0067382 A1 | 3/2009 | Li et al. | |
| 2009/0082028 A1 | 3/2009 | Hosein et al. | |
| 2010/0135177 A1 | 6/2010 | Liu et al. | |

OTHER PUBLICATIONS

Kim, et al., "Optimum Scheduling for Smart Antenna Systems in Rayleigh Fading Channels," IEEE Transactions on Communications, vol. 53, No. 7, Jul. 2005, pp. 1210-1219.

* cited by examiner

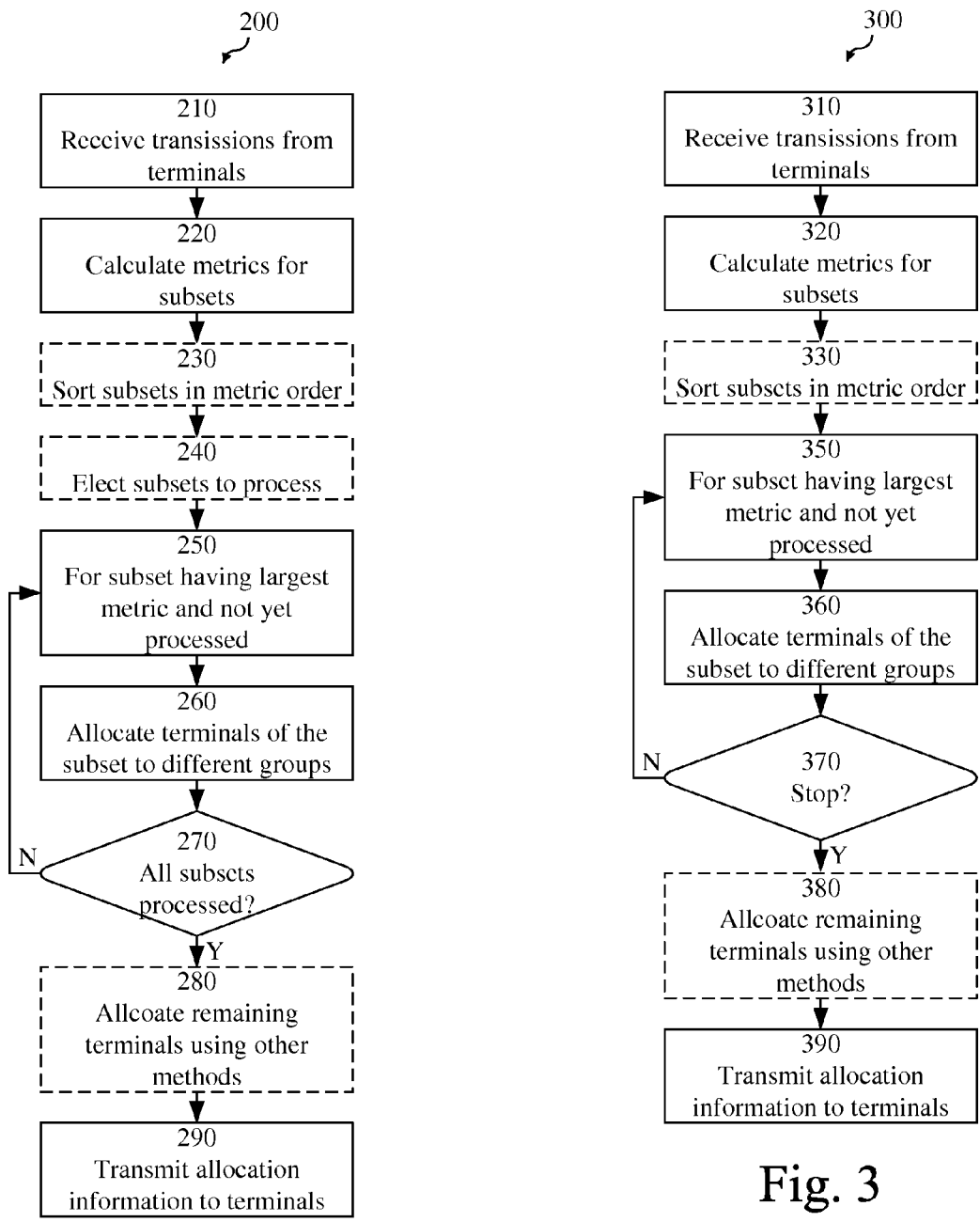

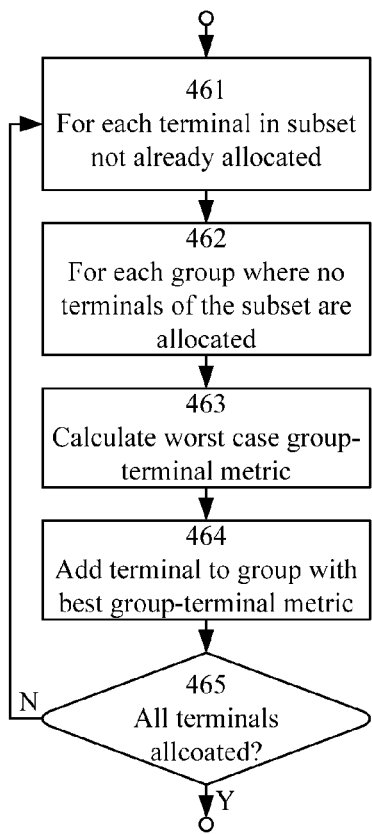
Fig. 4
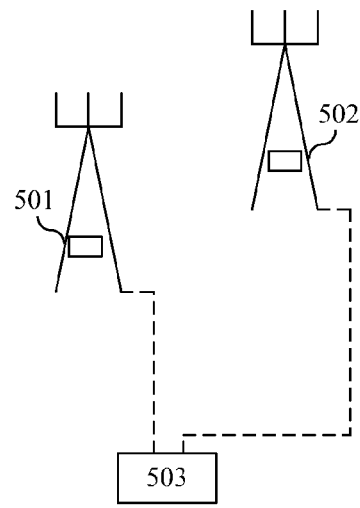
Fig. 5
Fig. 6
Fig. 7

SCHEDULING OF UP-LINK TRANSMISSIONS OF A WIRELESS COMMUNICATION SYSTEM

TECHNICAL FIELD

The present invention relates generally to the field of scheduling of up-link transmissions in a wireless communication system. More particularly, it relates to scheduling of a plurality of terminals into a number of groups, wherein the terminals of each group are intended for simultaneous up-link transmission.

BACKGROUND

In the up-link (UL) of a wireless communication system, a number of mobile terminals (MT) may be active (i.e. transmitting) at the same time. As an example, a HSPA (High Speed Packet Access) cell may support approximately 200 simultaneous VoIP (Voice over Internet Protocol) users. When transmissions from these terminals arrive at the base station(s), the received signals often interfere with each other. Due to the interference between signals from different terminals, it may be hard (or even impossible) to separate the signals belonging to different terminals at a single base station. A further related obstacle is that the strength of a signal from a particular terminal may be weak and/or vary rapidly over time.

One possible way to, at least to some extent, mitigate these problems is to employ multiple receive antennas at the base station. Multi-antenna receivers make possible the use of interference suppression and/or interference cancellation (IC). Multi-antenna receivers also provide diversity gain that may be used to mitigate fading. Multi-antenna solutions for wireless communication system traditionally utilize two or more antennas situated at the same base station site, thus limiting the geographical separation of the antennas.

A further extension of the principles used in multi-antenna solutions is to collect UL received signals from two or more base stations. One advantage with such an approach is that a larger geographical separation of the points of reception is achieved. A collection of signals in this context may typically involve collecting the base band signals from different base stations and use them for coordinated signal processing in a processing unit common to the base stations involved. An example application of this approach is the Coordinated Multi-Point (CoMP) evaluated for the Universal Mobile Telecommunication Standard Long Term Evolution (UMTS LTE).

When such an approach is used it will be possible to receive signals from different terminals and separate the respective signals from each other with improved average confidence. This is, at least partly, due to that interference suppression, interference cancellation, and/or other processing algorithms used may utilize additional joint information that becomes available about the signals sent from the different terminals. For example, more degrees of freedom are available for interference suppression and/or interference cancellation algorithms. Furthermore, robustness against fading may be further improved by utilizing that several versions (typically having different signal path combinations and thereby different fading patterns) of the same transmitted signal are available.

Utilizing signals from several base stations in coordinated processing (e.g. CoMP), the advanced interference cancellation/suppression algorithms and/or other coordinated signal processing may require significant signal processing resources. This is particularly true if the processing involves separation of signals from a large number of terminals, where at least some of the individual signals from different terminals are strongly coupled due to that their propagation channels have similar characteristics from the receiving base stations point of view. Signals that are strongly coupled in this way are typically harder to separate by signal processing.

The terminals may be effectively separated in the coordinated signal processing by use of non-linear receiver structures (e.g. receivers based on SIC—successive interference cancellation—or PIC—parallel interference cancellation). Alternatively, linear interference suppression methods may be applied (e.g. modified RAKE-based receivers such as GRAKEX+, where X refers to the number of RX—receiver—antennas per site). Using linear algorithms typically does not yield as efficient interference suppression as does non-linear algorithms. However, linear algorithms are typically less complex. Furthermore, it may be beneficial to employ linear algorithms since they may already be implementable in existing hardware in e.g. the base stations, while employing non-linear algorithms may require a hardware update.

Traditional strategies for scheduling of UL transmissions from the terminals focus on minimizing single-user SIR (signal-to-interference ratio). Thus, potential interference from other terminals is not accounted for which leads to notably degraded performance when there are multiple terminals, due to a large residual inter-terminal interference at the base stations and/or at the unit for coordinated processing (e.g. CoMP). This performance loss is particularly noticeable when linear interference suppression receivers are employed, because their interference suppression capability is worse than that of non-linear algorithm receivers.

Thus, alternative scheduling approaches have been developed to improve the terminal separation and thus the overall performance.

For example, the signals received from multiple terminals may be treated as MU-MIMO (multi-user multiple input multiple output) signals at the base stations and/or at the unit for coordinated processing (e.g. CoMP), whereby existing MU-MIMO scheduling approaches may be applied with the aim to maximize the spatial orthogonality between the simultaneously transmitting terminals.

In another example scheduling approach, several hypotheses may be evaluated where the terminals are divided into a number of groups in different ways for each hypothesis. The terminals in a group are intended for simultaneous transmission. The evaluation may comprise calculation of SIR or achievable data rate for each terminal and hypothesis, and the hypothesis having groups with maximum accumulated SIR or maximum accumulated rate may be used for scheduling.

Scheduling approaches that are MU-MIMO oriented are relatively simple. However, the number of simultaneously transmitting terminals is limited in that it cannot exceed the number of RX antennas at the base station (or the total number of RX antennas in a coordinated processing (e.g. CoMP) cell). Such a limitation makes the approach unsuitable for use when a coordinated processing cell should be designed to handle tens (or hundreds) of active terminals.

In principle, the hypothesis-based methods enable handling of an unlimited number of terminals. However, the associated computational complexity grows rapidly as the number of terminals increases. Consider, for example, a moderate sized set of N=60 terminals and suppose the terminals should be divided into K=3 groups of L=20 terminals in each. A full-complexity search for this realistic example would need to evaluate SIR or data rate for all possible groups of 20 terminals $(60!/(20!40!) \approx 4.2 \cdot 10^{15}$ groups) and choose the 3 disjoint groups that have the best performance according to the evaluation. This is clearly un-preferable and possibly infeasible.

Greedy algorithms, that do not evaluate all hypotheses, may be applied to mitigate the extreme complexity growth. In such algorithms groups may be successively grown by one terminal at a time. The terminals are processed one by one, evaluating the hypotheses of adding the particular terminal to each of the groups, and the terminal is finally added to the group where the resulting SIR or achievable data rate is optimized given the hypotheses for that particular terminal. Thus, the corresponding accumulated performance measure is incremented each time a terminal is added. Such an approach is less complex than an exhaustive evaluation, but yet it also suffers from large complexity. Furthermore, all terminals must be accommodated in a group and the possibility, that any of the terminals processed last (or near the end of the algorithm) destroys the performance regardless of which group it is added to, is not negligible.

Additional simplifications are possible to further reduce the number of hypotheses. However, even with a quite small number of hypotheses to evaluate each hypothesis requires building a hypothesis-specific interference model and computing a corresponding performance measure. These are operations requiring significant computational resources.

Therefore, there is a need for a scheduling approach for effectively scheduling terminals for UL transmission by dividing the terminals into a number of groups. Preferably, the approach should be a low-complexity algorithm able to handle an arbitrary number of terminals and achieving a close to optimal result (e.g. in terms of inter-terminal interference in each group).

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of the invention to provide methods, computer program products, arrangements (systems) and schedulers that divide a number of active terminals into a number of groups and that obviate at least some of the above disadvantages.

According to a first aspect of the invention, this is achieved by a method of operating a scheduler to schedule up-link transmissions of a first plurality of terminals of a wireless communication system into a second plurality of groups, wherein each group comprises terminals intended for simultaneous up-link transmission during a respective period of time. The method comprises receiving a respective transmission from each of the first plurality of terminals, and calculating a subset metric for each subset in a third plurality of subsets of the first plurality of terminals, wherein a size of each subset is less than or equal to the second plurality, and wherein the subset metric is calculated based on the transmissions received from the terminals of the subset and is indicative of a simultaneous transmission suitability measure for the terminals of the subset. The method further comprises forming a fourth plurality of subsets comprised in the third plurality of subsets, and processing each subset in the fourth plurality of subsets in subset metric order, starting with a subset having a subset metric indicating a least suitability of simultaneous transmission among the subsets of the fourth plurality of subsets. The processing comprises: scheduling each terminal of the subset, that is not already scheduled in a group, in a group of the second plurality of groups that does not comprise another terminal of the subset. The method also comprises transmitting, to each of the scheduled terminals, an information indicative of the respective period of time during which the scheduled terminal is intended to transmit.

In some embodiments a size of the second plurality may be based at least on a maximum delay between up-link transmissions of a terminal of the first plurality of terminals and a length of the respective period of time (i.e. the transmission time of each transmission opportunity for the terminal).

The subset metric may be based at least on a dominant direction of arrival of the transmissions received from the terminals of the subset. The subset metric may be further based on one or more of: a priority of transmissions, a transmission power, an expected coding rate, a desired quality of service measure, and a re-transmission acceptance measure—all relating to at least one of the terminals of the subset.

In some embodiments, the subset size may be two and the subset metric may be a pair-wise metric. In such embodiments, each of the terminals of the pair may have a corresponding channel estimate vector and the pair-wise metric may be based at least on a normalized inner product of the corresponding channel estimate vectors of the terminals of the pair.

The size of the fourth plurality may be equal to the size of the third plurality.

Alternatively, the size of the fourth plurality may be equal to a predetermined number smaller than the size of the third plurality. In such embodiments, each of the subsets in the fourth plurality of subsets may have a subset metric indicating a less suitability of simultaneous transmission than the subset metric of any of the subsets not comprised in the fourth plurality.

In some embodiments, the size of the fourth plurality may be smaller than the size of the third plurality, and the fourth plurality of subsets may comprise all subsets having a subset metric that falls on a first side of a simultaneous transmission suitability measure threshold and indicates a less suitability of simultaneous transmission than subset metrics that fall on a second side of the simultaneous transmission suitability measure threshold.

The step of scheduling each terminal of a subset in a group that does not comprise another terminal of the subset may comprise determining, for each group of the second plurality of groups that does not comprise another terminal of the subset, a terminal-specific group metric comprising a subset metric indicating a least suitability of simultaneous transmission among subsets comprising the terminal to be scheduled and terminals already scheduled in the group, and scheduling the terminal in a group having a terminal-specific group metric indicating a most suitability of simultaneous transmission among the determined terminal-specific group metrics.

A second aspect of the invention is a computer program product comprising a computer readable medium, having thereon a computer program comprising program instructions, the computer program being loadable into a data-processing unit and adapted to cause the data-processing unit to execute at least the steps of following steps according to the first aspect when the computer program is run by the data-processing unit: calculating the subset metric for each subset in the third plurality of subsets of the first plurality of terminals; forming the fourth plurality of subsets comprised in the third plurality of subsets; and processing each subset in the fourth plurality of subsets in subset metric order, starting with the subset having a subset metric indicating a least suitability of simultaneous transmission among the subsets of the fourth plurality of subsets, by: scheduling each terminal of the subset, that is not already scheduled in a group, in a group of the second plurality of groups that does not comprise another terminal of the subset.

A third aspect of the invention is a scheduler adapted to schedule up-link transmissions of a first plurality of terminals of a wireless communication system into a second plurality of groups, wherein each group comprises terminals intended for simultaneous up-link transmission during a respective period of time. The scheduler is adapted to calculate a subset metric for each subset in a third plurality of subsets of the first plurality of terminals, wherein a size of each subset is less than or equal to the second plurality, and wherein the subset metric is calculated based on respective transmissions received from each of the terminals of the subset and is indicative of a simultaneous transmission suitability measure for the terminals of the subset, form a fourth plurality of subsets comprised in the third plurality of subsets, and process each subset in the fourth plurality of subsets in subset metric order, starting with a subset having a subset metric indicating a least suitability of simultaneous transmission among the subsets of the fourth plurality of subsets, by: scheduling each terminal of the subset, that is not already scheduled in a group, in a group of the second plurality of groups that does not comprise another terminal of the subset.

A fourth aspect of the invention is an arrangement comprising a scheduler according the third aspect of the invention, at least one receiver adapted to receive the respective transmissions from each of the first plurality of terminals, and a transmitter adapted to transmit, to each of the scheduled terminals, an information indicative of the respective period of time during which the scheduled terminal is intended to transmit.

In some embodiments, the third and fourth aspects of the invention may additionally have features identical with or corresponding to any of the various features as explained above for the first aspect of the invention.

An advantage of some embodiments of the invention is that a low-complexity algorithm is provided.

Another advantage of some embodiments of the invention is that close to optimal result is achieved with regard to inter-terminal interference. Another advantage of some embodiments of the invention is that a straight-forward way of determining in which order the terminals are to be processed is provided.

Another advantage of some embodiments of the invention is that straight-forward ways are provided of determining how many and which of the terminals need to be evaluated before they are scheduled. Consequently, ways are provided of determining how many and which of the terminals may be scheduled using an even less complex algorithm (e.g. arbitrary scheduling or single user scenario based scheduling).

Another advantage of some embodiments of the invention is that separation of at least the terminals that are least suitable to transmit simultaneously is ensured.

Another advantage of some embodiments of the invention is that efficient coordinated signal processing is enabled even if the computational resources (hardware and/or software) are limited.

Another advantage of some embodiments of the invention is that migration in existing systems to coordinated signal processing is facilitated.

Another advantage of some embodiments of the invention is that they may be applied to both coordinated signal processing solutions and single base station solutions.

Another advantage of some embodiments of the invention is that different metrics are provided for indicating how suitable it is to allow simultaneous transmission of two or more particular terminals. The metrics may be based on considerations of the spatiality of the signals received from the particular terminals (e.g. how similar the directions of arrivals are).

BRIEF DESCRIPTION OF THE DRAWINGS

Further objects, features and advantages of the invention will appear from the following detailed description of embodiments of the invention, with reference being made to the accompanying drawings, in which:

FIG. 2 is a flowchart illustrating example method steps according to some embodiments of the invention;

FIG. 3 is a flowchart illustrating example method steps according to some embodiments of the invention;

FIG. 4 is a flowchart illustrating example method steps according to some embodiments of the invention;

FIG. 5 is a schematic drawing illustrating a system comprising an example arrangement according to some embodiments of the invention;

FIG. 6 is a schematic drawing illustrating a base station site comprising an example arrangement according to some embodiments of the invention; and FIG. 7 is a schematic drawing illustrating a processing unit and a computer readable medium according to some embodiments of the invention.

DETAILED DESCRIPTION

There is a need for a more efficient approach than the ones described above, not requiring computation of elaborate joint characteristics over the subsets, in order to manage a large number of simultaneous users.

In the following, embodiments of the invention will be described where a new approach to terminal grouping is employed. An object for some of the embodiments to be described below is finding a terminal grouping where (if the terminals in each group transmit simultaneously, and terminals in different group do not transmit simultaneously) inter-terminal interference is minimized. Since finding an optimal solution may be very complex (e.g. growing rapidly with the number of terminals to group) embodiments of the invention present sub-optimal (e.g. reduced, close to minimal inter-terminal interference), low-complex solutions which are yet robust and performing well.

Figure 1A:
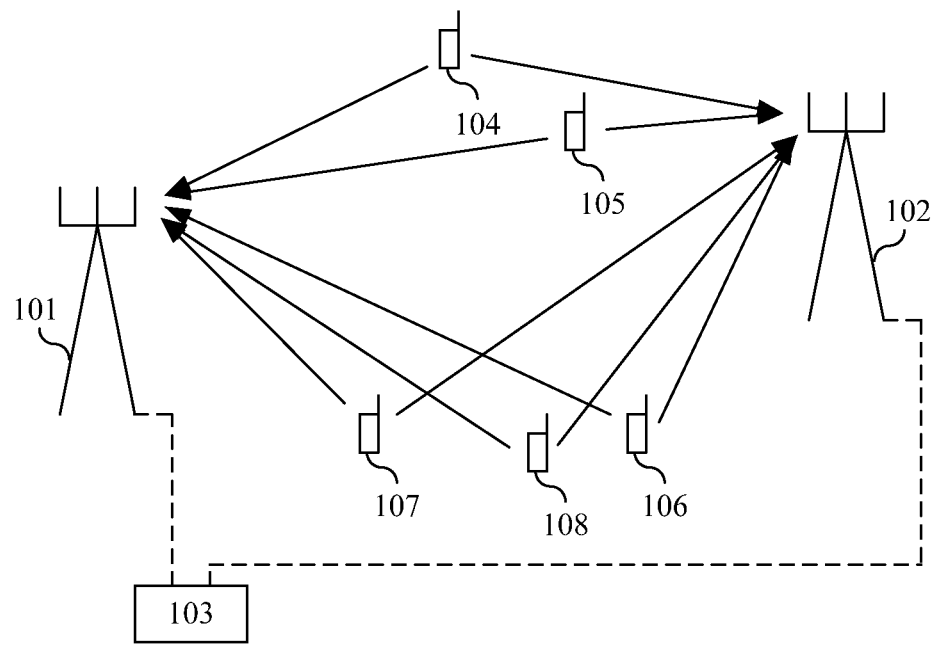
FIG. 1A is a schematic drawing illustrating a number of mobile terminals connected, through radio links, to a plurality of base station sites, the base station sites being associated with a scheduling unit.

FIG. 1A illustrates a situation where five terminals 104, 105, 106, 107, 108 transmit in the up-link (transmissions represented by arrows in FIG. 1A) to two base station sites 101, 102. The base station sites 101, 102 are both connected to a common combiner and/or scheduler 103, where the communications between the terminals and the base stations are coordinated. As is clearly seen in the figure, it may be difficult for each of the base stations and/or for the common combiner to separate simultaneous up-link signaling from terminals 104 and 105 since, at both base stations, the signals from these terminals arrive from a similar special direction. For similar reasons, it may be difficult to separate simultaneous up-link signaling from terminals 106 and 108, and simultaneous up-link signaling from terminals 107 and 108.

Figure 1B:
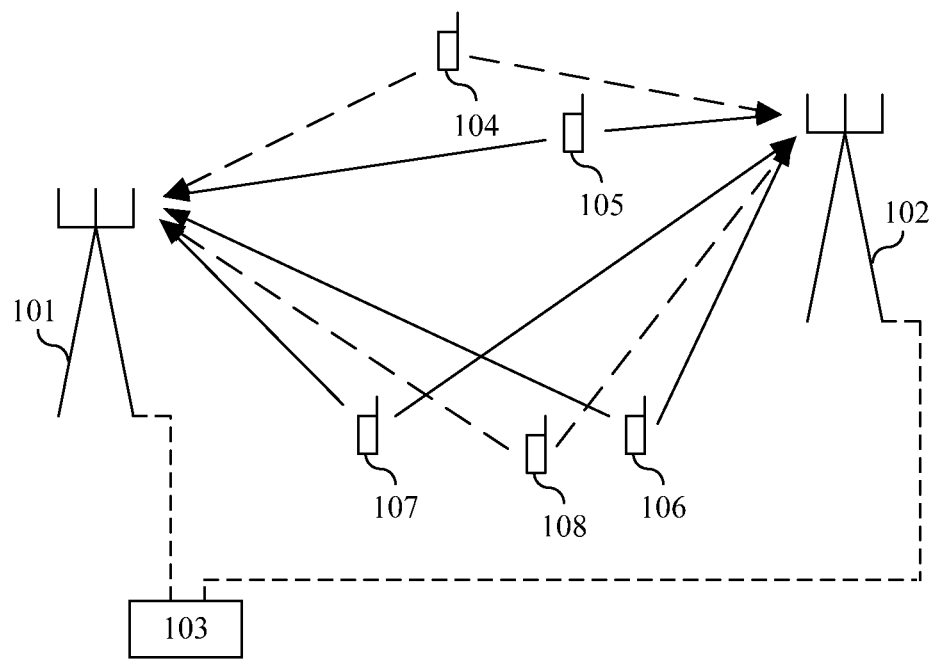
FIG. 1B is a schematic drawing illustrating a similar situation as in FIG. 1A, wherein the scheduling unit may comprise an arrangement according to some embodiments of the invention.

FIG. 1B illustrates a similar situation as in FIG. 1A. However, in FIG. 1B, the up-link transmissions of the five terminals 104, 105, 106, 107, 108 have been separated in time, such that terminals 104 and 108 transmit simultaneously during a first time period (illustrated by dashed arrows) and terminals 105, 106 and 107 transmit simultaneously during a second time period (illustrated by continuous arrows). Typically, the second time period is disjunct from the first time period. Thus, FIG. 1B illustrates a grouping of terminals that is suitable to use when scheduling up-link transmissions in that terminals in the same group are relatively easily separated by a receiver.

To perform the grouping it may be beneficial to have some type of measure indicating which terminals are more or less suitable to transmit simultaneously with other terminals. To that end, a metric may be tabulated for each pair (or larger subset) of terminals (taking account of e.g. their mutual interference impact). The sorting of terminals into groups may then be performed by processing the subsets sequentially, using the criterion that allocating terminals with significant mutual interference in the same subset should be avoided.

After grouping, the terminals in the same group may transmit their signals simultaneously. Using this approach facilitates the separation of the terminals' signals in an interference suppressing/canceling (single-cell or CoMP) processing unit, and may be particularly useful in situations with limited hardware capability. However, even for the situation where there are no severe hardware limitations (e.g. in a full-complexity CoMP unit), the performance may be improved and/or the complexity (e.g. the number of required SIC/PIC iterations) may be reduced by using embodiments of the invention.

It is noteworthy that, although many examples are given in relation to CoMP, embodiments of the invention may be equally applicable for other systems where signals for several base station sites are combined and/or in a single base station or single cell context where the up-link receiver employs multiple antennas.

It should be noted that other parameters than inter-terminal interference may also be taken into account in the grouping according to some embodiments of the invention. For example, different terminals (or different types of communication) may be given different priority.

As opposed to other sub-optimal approaches to the terminal grouping problem, which may use the principle of grouping together terminals that are particularly suitable to transmit simultaneously, some embodiments of the invention employ the principle of trying to separate terminals that are particularly un-suitable to transmit simultaneously into different groups. In a greedy algorithm, it is a problem that the order in which the hypotheses are tested is not well-structured. This results in the above-mentioned problem, that a terminal that is to be added to a group close to the end of the grouping process may not fit into any of the groups and thus destroys the entire grouping. It would have been more beneficial to start with such terminals, but this conclusion is not drawn until very late in the grouping process. Thus, a large amount of calculations and other processing is in vain when these approaches are used.

Furthermore, there is no upper limit to the number of terminals that may be accommodated in each group in embodiments of the invention. This is contrary to some of the grouping approaches as described above, where the number of users in a group is limited by the number of receiver antennas at a base station site and/or the number of sites involved in a combining process.

Thus, embodiments of the invention provide for an approach where many terminals can be accommodated in each group, while the complexity of the grouping process is kept low. It is also noteworthy that the approach provides for high performance and robustness.

Performance may, for example, be measured as how similar the grouping is to the optimal grouping. Another performance measure example may be how well the grouping performs in terms of e.g. data throughput compared to the optimal grouping. Robustness may, for example, indicate that the approach is not sensitive to small variations in e.g. direction of an incoming signal, signal strength, etc.

According to some embodiments of the invention a subset size is set, and a metric is calculated for each possible subset of that particular size, where the subsets are taken from a plurality of terminals under consideration for up-link transmission. In some embodiments all possible subsets are not considered, but only those associated with incoming signals from approximately the same direction.

Typically, the subset size may be two (thus considering all possible pairs of terminals), or equal to the number of groups available for scheduling, or any number there between. Typically, the computational complexity grows as the with the subset size.

As will be evident by the examples described in connection to embodiments of the invention, the metric for each subset may be calculated in numerous different ways. For example, the metric may be based on signals received from the respective terminals under consideration. The metric may be indicative of a level interference that the terminals of the subset expose each other to. In some embodiments, the level of interference that the terminals of the subset expose each other to is merely one of the parameters taken into account when calculating the metric. Other parameters to consider in the metric calculation may include priorities given to certain terminals or certain types of transmissions (e.g. a communication device of some public authority like the police and/or emergency calls may be given high priority), transmission power levels of the terminals (e.g. granted transmission power), expected coding rates, desired quality of service, and/or whether or not the current service of a terminal is robust regarding re-transmissions (e.g. in real time applications, such as gaming involving several parties, it may not be acceptable with re-transmissions due to response time requirements, which may be reflected in the metric to increase the probability of grouping this terminal into a group with low interference towards the terminal).

In some embodiments, the number of groups available for scheduling the terminals in is limited. For example, when real time applications (e.g. VoIP—Voice over Internet Protocol) are considered, there is often a stipulated maximum delay between transmitted units of data (packets, frames, or similar) in the up-link. Such stipulations, together with the duration of each unit of data, directly relate to a limitation on the number of groups that it is possible to use.

In other embodiments (e.g. non-real time situations) there are no limitations on the number of groups and a trade-off may be considered between low interference (many groups) and high throughput per terminal (few groups).

The number of terminals scheduled to a group may be the same or similar for each of the groups. Alternatively, the number of terminals per group may vary. For example, a terminal with extremely high priority communication may be scheduled in its own group.

The number of terminals that can be scheduled to each group (and thus the number of terminals that can be accommodated in a cell) may be limited in some embodiments. For example, the number of receive antennas and/or the number of base station sites involved may impose limitations on the number of terminals in each group, as well as the interference handling capabilities of the processing chain (e.g. PIC, SIC, GRAKE, etc).

When the metrics have been calculated, some embodiments provide for a choice regarding how many and which subsets to process according to the approach of separating terminals that are particularly un-suitable to transmit simultaneously into different groups. In some embodiments, all subsets are processed according to this approach. In some embodiments only some of the subsets are processed according to this approach.

In the latter case, the subsets to be processed according to this approach may be chosen as a particular number of subsets, and the subsets having the worst metrics (i.e. being least suitable for simultaneous transmission) may be chosen for processing. The particular number may for example be determined taking processing capacity into account. The particular number may be a predetermined number or it may be dynamically changed. For example, there may be a dynamic mechanism to ensure that all potentially problematic subsets as explicitly handled (this is elaborated in the next paragraph). Alternatively or additionally, there may be a dynamic mechanism for the particular number in relation to the currently available processing resources (e.g., there may be more DSP resources available for use in the scheduling process if channels with low dispersion are handled and/or if few RAKE-fingers are employed there may be in other scenarios). An advantage with using a predetermined number is that the computational load may be kept constant and is known beforehand, while dynamic selection may enable more efficient usage of the totally available resources and/or may be able to provide a guarantee of some minimum performance level.

In some embodiments, the subsets to be processed according to this approach may be chosen as the subsets having a metric that falls on a particular side of a metric threshold (i.e. having a metric that indicates less suitability for simultaneous transmission than metrics on the other side of the threshold. Thus, the number of subsets processed may vary in these embodiments. The metric threshold may be a predetermined threshold or it may be dynamically changed in relation to e.g. the geometry factor or the target SIR operating point (higher SIR scenarios is more sensitive to multi-user interference).

In the embodiments where only some of the subsets are processed according to the approach of separating terminals that are particularly un-suitable to transmit simultaneously into different groups, the remaining subsets are processed using any other algorithm, preferably an even less complex one. For example, the terminals that have not yet been allocated to a group may be randomly allocated to the groups (possibly while keeping the number of terminals in different groups at or below a particular value). Terminals that have not yet been allocated may alternatively be allocated using a greedy algorithm as described above or any other known or future method.

The subsets to be processed according to the approach of separating terminals that are particularly un-suitable to transmit simultaneously into different groups, are typically processed in metric order—starting with the subset that has a metric that indicate a least suitability of simultaneous transmission. The subsets to be processed may be sorted in metric order and saved in a list or similar data structure to facilitate the remainder of the processing. This is, however, optional and the algorithm may also search for the, not yet processed, worst case metric each time a new subset is to be processed.

It is also noteworthy that a sorted list may be helpful in the determination process when only some of the subsets are chosen as explained above.

When processing the subsets in metric order, each of the terminals of each subset is allocated to a respective group, provided the terminal is not already allocated to a group. The allocation aims at sorting the terminals of a subset into different groups. This can, for example, be achieved by simply allocating each (not already allocated) terminal to a group where no other terminal of the group resides. This is always possible if the subset size is less or equal to the number of groups. Another way of sorting the terminals of a subset into different groups also takes account of which of the possible groups suits best for the terminal under consideration as will be exemplified later on.

When all terminals have been sorted into a group, the terminals are informed of their respective allocation. For example, each terminal may be sent an indication of when it is expected to transmit in the up-link.

Additional criteria may also be used in the grouping process (e.g. when selecting the number of groups, determining the metrics, and/or performing the actual grouping). For example, the associated computational load or the power consumption in a CoMP processing unit may be taken into account when determining how many of the subsets are to be processed according to the approach of separating terminals that are particularly un-suitable to transmit simultaneously into different groups (see, for example, the embodiment above where the subsets to be processed are chosen as a dynamic particular number of subsets—the dynamic particular number may be dependent of the momentary computational load).

In the following, it is assumed that there are N terminals under consideration and M receiver antennas (which may or may not be situated at up to M different geographical locations). The M antennas may be situated in pairs at M/2 geographical sites, or four by four at M/4 sites, or in any other suitable constellation.

In such a scenario there are at least MN possible radio channels that may be estimated either in a respective receiver at each site or collectively at a combiner unit (e.g. CoMP processing unit). The channel estimation may be performed according to any known or future channel estimation algorithm and may depend on the radio access technology (RAT) used in the system and on how advanced the receiver(s) are. The subset metrics may be calculated based on channel estimations.

As mentioned above, embodiments of the invention aim at defining groups where major mutual interference instances between terminals in each group are avoided. A principle employed by some embodiments of the invention is to identify the terminal subsets (e.g. pairs) that are least suitable for simultaneous transmission (e.g. that disturb each other the most) and form the groups so that these terminals are separated into different groups. To exemplify one possible way of separating such terminals into different groups, an approach with subset size two (i.e. pairs) will be considered. For a set of N terminals, there are in general N(N−1) pairs to evaluate. However, if the metric is symmetric (e.g. the interference imposed by terminal i on terminal j equals the interference imposed by terminal j on terminal i), it is sufficient to evaluate the metric of only N(N−1)/2 pairs. The metric between terminals i and j may be denoted by $D(i,j)$.

Assuming symmetric metrics and that a high metric indicates worse suitability of simultaneous transmission, one possible way of sorting of terminals into groups may be performed as follows:

Sort the metrics $D(i,j)$, $i>j$ in descending order and store the corresponding information in a list of length $k=N(N-1)/2$. The list may be in the form of a data structure, a linked list, and array, or similar. Each entry may contain the terminal indexes of that particular pair. In some embodiments the entry also contains the metric of the pair, in some embodiments it does not.

For all k, starting with the pair {i(k), j(k)} with highest metric:
  a. For terminal i(k):
    i. If terminal is already allocated to a group, go to next terminal, else:
      determine the largest terminal-specific metric for each group S, where j(k) is not allocated (j(k)∉S) as $d(i(k),S)=\max_{s\in S}(D(i(k),s))$ and denote it the terminal-specific group metric
      add user i(k) to the group with the smallest d(i(k),S)
  b. For terminal j(k):
    i. If terminal is already allocated to a group, go to next pair, else:
      determine the largest terminal-specific metric for each group S, where i(k) is not allocated as $d(j(k),S)=\max_{s\in S}(D(j(k),s))$
      add user j(k) to the group with the smallest d(j(k),S)

As mentioned before, the process may be applied to all k pairs, or only to some of the pairs (e.g. by truncating the list to only those pairs with a metric that exceeds a threshold, or to a predetermined number of pairs having the highest metrics).

As mentioned before, the metrics may be calculated in various ways, which will now be illustrated through a number of example embodiments.

In many scenarios, the main source of residual inter-terminal interference (i.e. after interference cancellation/suppression in the receiver) in the up-link comprises signals sent from other terminals and arriving from the same spatial direction as the signal of a terminal under consideration. In such cases, suppression of the interfering terminals using spatial selectivity (e.g. receiver lobe-forming) in the base station may not be efficient, since the base station antenna pattern resolution (the number of independent nulls) and the ability of steering it is limited. In LOS (line of sight) conditions, the interference pattern is relatively constant and is typically created by the terminals being located in the same physical direction from the base station. In fading conditions, on the other hand, the apparent direction of arrival for each signal changes with the fading, depending on the instantaneously dominating multipath reflections for each of the signals involved. Thus, the inter-terminal interference for a given terminal pair may vary significantly over time.

One way of determining a metric that is indicative of the interference between terminals is to use information about the dominant instantaneous directions of arrival of signals from the different terminals under consideration.

To simplify the presentation, a CDMA system (e.g. WCDMA/HSPA) is used as example. In the example system, the channel corresponding to each TX-RX antenna pair is characterized by one dominant complex coefficient. It is assumed that the terminals each comprise a single transmit antenna. It is to be noted that this system setup is merely an example and is in no way meant as limiting. Contrarily, embodiments of the invention are equally applicable to other systems (e.g. OFDMA-based systems), more dispersive multipath channels, and/or multiple transmit antennas at the terminals.

The metric may, for example, be based on correlations between the channel estimates of the terminals involved.

The propagation environment between terminal i and receiver antenna m may be described by a list of complex coefficients $h_m^{(i)}=[h_{m,1}^{(i)} \ldots h_{m,T}^{(i)}]$, where each coefficient may be a channel estimate for an independently varying multipath component. (If the number of physical multipath components is less than T, the remaining entries may be padded with zeros.)

In many situations, the propagation channel has low dispersion or one path in a multi-cluster channel is dominant. Then, for the interference analysis purposes, the channel is well approximated by a single channel coefficient: $h_m^{(i)}=h_{m,t^*}^{(i)}$, where $t^*=\arg_t\max|h_{m,t}^{(i)}|$ is the index of the channel coefficient with maximum magnitude. The composite channel from terminal i to all receiver antennas is then described by the vector $c^{(i)}=[h_1^{(i)} \ldots h_M^{(i)}]^T$.

Using a correlation coefficient between the terminal-specific estimates of the respective propagation channels in a metric calculation provides for a low-complexity grouping method. By analyzing the correlation coefficients, the "spatially overlapping" terminals (e.g. having signals arriving from the same or similar direction) may be identified. This information may be used to avoid placing such terminals in the same group for simultaneous transmission. It may be beneficial if the terminals of each group have channels that are maximally mutually orthogonal. Typically, a lower correlation (i.e. the better the pair-wise, or subset-wise, orthogonality) may yield a better performance of the interference suppression/cancellation method, in particular one with limited complexity.

Supposedly, each of the N terminals has a 1xM channel estimate column vector associated with it as described above. The correlation factor between two terminals may be computed as the normalized inner product magnitude of the respective channel estimation vectors:

$$D(i,j) = \frac{\left|c^{(i)H} c^{(j)}\right|}{\sqrt{|c^{(i)}|^2 |c^{(j)}|^2}}.$$

The correlation factor may be used directly as the metric associated with that particular terminal pair. The correlation factors may, for example, be organized as an NxN table T. If the metric is symmetric (as is the case in this example) only an upper (or lower) triangle of the table needs to be computed.

If several dominant paths per receiver antenna are present the channel estimation is not correctly approximated by a column vector as was the case in the example above. In such situations, accounting for the multiple arrival directions and the ability of the multi-antenna base station receiver to exclude energy arriving from undesired directions results in an alternative metric. For each multipath profile $h_m^{(i)}$ between a terminal and a receiver antenna, it may be sufficient to use one path with moderate interference for an appropriate metric. That path should be relatively strong (i.e. not in a deep fade), but it is not necessarily the strongest path. Additionally, that path should preferably be separable from the other paths of the same terminal and paths of the other terminal of the pair. Thus, a possible metric definition is:

$$D(i,j) = \min_{A,B} \frac{\left|c_A^{(i)H} c_B^{(j)}\right|}{\sqrt{|c_A^{(i)}|^2 |c_B^{(j)}|^2}},$$

where A and B are subsets of coefficients extracted from $\hat{h}_m^{(i)}$ and $\hat{h}_m^{(j)}$ respectively, representing candidate paths as explained above (one path per terminal and RX antenna). The minimization space may be exhaustive, or only a subset of the largest coefficients may be included to limit the search process. In the latter case, the remaining paths may be suppressed using the multiple antenna setup.

This metric may be seen as a variant of the normalized inner product magnitude method, where the path used is not identified based on a maximum magnitude of the channel estimates, but as the path involved in a winning combination when accounting for receiver capabilities.

In some embodiments, the channel estimate vectors described above may be used in a different way to form a metric to evaluate the per-pair orthogonality. In such embodiments, the respective 1×M column channel estimate vectors of a pair of terminals may be used to form a 2×M channel coefficient matrix. The channel coefficient matrix may be factorized using Singular Value Decomposition (SVD). The squared singular values of the resulting diagonal matrix correspond to optimal signal energy loading for transmission from the two terminals under consideration to the M receive antennas, provided that the terminals apply ideal pre-coding (which may be found in the SVD result) and the CoMP unit uses proper linear combining for signal separation (which may also be found in the SVD result). The result may also be seen as a performance indication of a non-linear CoMP unit with no (or non-ideal) pre-coding at the terminals. While such performance indications are optimistic and may not be directly applicable for a practical receiver handling more than two terminals, the relative performance differences between the terminal pairs may be used to determine the scheduling groups.

For example, the SVD output may be used to determine the metrics by using the left singular vector set reported by the SVD (which would be the optimal pre-coding weights) to assess the non-orthogonality of the channel—the closer to diagonal the singular vector matrix is, the less correlation there is between the terminals, which may be reflected in the metric by assigning a lower value D(i,j).

Alternatively or additionally, the SVD output may be used to determine the metrics by deriving the condition number of the channel from the singular values—a high condition number indicates difficulties in separating the terminals in the receiver, which may be reflected in the metric by assigning a higher value D(i,j).

Yet alternatively or additionally, the SVD output may be used to determine the metrics by basing the metric on the sum of available signal energies—higher energies may be reflected in the metric by assigning a lower value D(i,j).

A symmetric metric, D(i,j)=D(j,i), implies that the terminals in each pair incur equal interference from each other. In some situations, this may not be an adequate assumption. Thus, additional parameters may be taken into account in the metric calculation, which may lead to an asymmetrical metric.

For example, if the power levels P(i), P(j) of the signals received from the two terminals in a pair are different, the metric may be multiplied by the interferer's power: D'(i,j)=P(i)*D(i,j) and D'(j,i)=P(j)*D(i,j).

If the normalized inner product magnitude calculations described above are taken as a starting point, and channel strength imbalance (i.e. that the stronger channel disturbs the weaker one significantly more than vice versa) is to be accounted for, an asymmetric metric D(i,j)≠D(j,i) may be formed as $$D(i, j) = \frac{|c^{(i)H} c^{(j)}|}{\sqrt{|c^{(i)}|^2 |c^{(j)}|^2}} \frac{|c^{(i)}|^2}{|c^{(j)}|^2} = |c^{(i)H} c^{(j)}| \frac{|c^{(i)}|}{|c^{(j)}|^3}$$

or $$D(i, j) = \frac{|c^{(i)H} c^{(j)}|}{\sqrt{|c^{(i)}|^2 |c^{(j)}|^2}} \frac{|c^{(i)}|}{|c^{(j)}|} = \frac{|c^{(i)H} c^{(j)}|}{|c^{(j)}|^2}.$$

This asymmetric metric structure may preferably be used together with the additional power-related scaling step described above.

Another example is if the data transmission from terminal i is expected to have, for example, a higher coding rate (lower robustness), or if it is desired to increase the quality of service for terminal i for other reasons. Then, the metric of that terminal with respect to all other terminals may be increased by a factor C(i): D'(i,:)=C(i)*D(i,:). Numerous other criteria may be taken into account to modify the D(i,j) values, for example, terminals may be prioritized differently based on various criteria (e.g. terminals for which re-transmissions are particularly undesirable and/or terminals expected to send particularly important signals may be assigned a higher metric to make sure the transmissions will be well received). The metric may be multiplied by a terminal-specific priority value F(i) to reflect such considerations: D'(i,:)=F(i)*D(i,:). Naturally, combinations of two or more of the parameters exemplified above may also be considered.

When asymmetric metrics are applied, it also has to be determined which of the metrics D(i,j)≠D(j,i) should be tagged to the terminal pair i,j. One possible way to chose the pair-wise metric is to take the worst case metric D"(i,j)=max[D'(i,j),D'(j,i)]. Another possibility is to take an average value D"(i,j)=(D'(i,j)+D'(j,i))/2.

As mentioned above a subset size larger than two may also be considered. Then, the metrics need to account for the interaction between more than two terminals. A metric between, for example, three terminals may be used to determine which three terminals (out of many) are most un-suitable to transmit simultaneously and thus need to be separated into separate scheduling groups.

One approach when calculating a metric suitable for this situation is to assume that the three terminals that are most un-suitable to transmit simultaneously are probably characterized in that all pairs (among the three) have large pair-wise metrics. Following this assumption, one possible metric for three-terminal subsets is:

$$D(i,j,k)=D(i,j)D(j,k)D(k,i)$$

An alternative metric for three-terminal subsets may be:

$$D(i,j,k)=\min(D(i,j),D(j,k),D(k,i))$$

This alternative is particularly useful if most of the pair-wise metrics have a value close to the maximum value (e.g. close to one for the normalized inner product case). An advantage with the latter alternative metric is that it may be easier to compute, especially in the generalized case with subset sizes even larger than three.

As mentioned above, the grouping methods described above may also be extended to terminals with multiple transmit antennas. Such terminals may have pre-coding capability to be able to exploit the benefits of the multiple antennas.

Assuming that there are x possible pre-coding weights, the algorithms presented above may be used with the adjustment that each terminal is considered as X different virtual terminals (with different pre-coding), out of which exactly one must be scheduled. The search space may in such an approach be treated as including NX terminals instead of N, with the simplification that combinations of virtual terminals representing different pre-codings of the same terminal would not need to be evaluated, and with the condition that exactly one of the virtual terminals representing different pre-codings of the same terminal must be sorted into one of the groups.

In other embodiments, the pre-coding setting may be determined separately from the grouping, and in such cases, the algorithms for single transmit antenna may be used directly.

For low-mobility terminals, the grouping need not be performed fully (or at all) at each scheduling instant as is the preferable case for high-mobility scenarios. The grouping may be updated at longer time intervals in the former case. However, in order to verify the appropriateness of the groups and ascertain good grouping quality, it may be advantageous in some embodiments to repeat the grouping process (one or more) shortly after the initial grouping even if a low-mobility scenario is at hand and a longer time interval is to be applied further on. This is because the channel estimation quality may be improved from the initial channel estimation to a subsequent channel estimation, and thus the grouping may be improved.

Feedback may be given to the scheduler (or to higher layers of the system) according to some embodiments of the invention. Such feedback may be indicative of how well a particular grouping worked (e.g. in the form of a worst group metric, an indication of the worst-interfering terminal of each group, data throughput figures, etc). The feedback may be utilized by the scheduler to adapt the grouping process by changing the number of groups, by changing priorities of some terminals, and/or by changing relative grants. Alternatively or additionally, the feedback may be utilized by higher layers (e.g. to force terminals that interfere too much to perform handover to other cells, CoMPs, frequency bands, and/or RATs).

FIG. 2 illustrate an example method 200 according to some embodiments of the invention.

In step 210, up-link transmissions are received from a plurality of terminals. The received transmissions may be processed in a receiver or other processing device, e.g. a channel estimate may be calculated for each terminal. In step 220, metrics are calculated for all subsets (e.g. pairs) according to, for example, any of the example metric calculation methods described above.

The subsets may be sorted in metric order in optional step 230, and stored in a list or similar structure.

In optional step 240, it may be determined to process all subsets or only some subsets according to steps 250, 260 and 270. As described above, it may be decided to process only a (predetermined or not) number of subsets (e.g. those with the worst metric), or only the subsets that have a metric that falls on a particular side of a metric threshold.

In step 250, the subset having the worst metric in terms of suitability for simultaneous transmission (which in FIG. 2 is illustrated as the largest metric, but may just as well be the smallest or other metric depending on the metric definition) among the not yet processed subsets is chosen.

In step 260, it is seen to that all terminals of the chosen subset are allocated to different groups, if possible. This should be possible for all terminals not already allocated if the subset size is smaller or equal to the number of groups. The allocation may, for example, be according to any of the grouping methods described above. The allocation method may simply see to that terminals in the same subset are put in different groups, or the additional condition of minimizing the terminal-specific group metric may be applied.

In step 270, the method is steered back to step 250 if there are more subsets to be processed according to the principles of steps 250 and 260. Otherwise, e.g. if all the subsets or all the subsets elected in step 240 have been processed, the method continues to optional step 280.

In step 280, any terminals of subsets that have not yet been processed may be allocated to a respective group, for example, arbitrarily or according to any known or future allocation method.

In step 290, a respective indication is transmitted to each of the terminals, informing the terminal at least of its own scheduling parameters (e.g. the time period during which it is intended to transmit).

FIG. 3 also illustrate an example method 300 according to some embodiments of the invention.

Steps 310, 320, 330, 350, 360, 380 and 390 of the method 300 are similar or corresponding to steps 210, 220, 230, 250, 260, 280 and 290 respectively of method 200, and will therefore not be described in detail.

When the method reaches step 370, a stopping condition is checked. If the stopping condition is not met the method is steered back to step 350 and more subsets are processed according to the principles of steps 350 and 360. If the stopping condition is met, the method continues to optional step 380. The stopping condition may, for example be one of the following:

Have all possible subsets been processed?
Have all terminals been sorted into a group? (This may very well happen before all subsets have been processed, and using this condition may reduce the computational load while not affecting the performance of the grouping at all.)
Have a predetermined number of subsets been processed?
Have all subsets associated with a metric that meets a metric condition (e.g. has a value that is larger than a threshold) been processed?

FIG. 4 illustrates example method steps according to some embodiments of the invention. The method steps illustrated may, for example, be performed as part of any of steps 260 or 360 of the methods 200 and 300 respectively.

In step 461, a not already grouped terminal of the subset is chosen. In step 462, the groups that do not already comprise a terminal of the same subset are identified. In step 463, the relation of the chosen terminal to each of the identified groups is evaluated. For example, it may be determined which terminal of each group is least suitable to transmit simultaneously with the chosen terminal (corresponding to a worst case metric for the group). In step 464, the chosen terminal is added to one of the identified groups taking the evaluation of step 463 into account. For example, the chosen terminal may be added to the group having a best worst case metric (i.e. the terminal of the group being least suitable to transmit simultaneously with the chosen terminal is the most suitable terminal among the groups). In step 465, it is checked whether there are more not already grouped terminals in the subset, in which case the processing returns to step 461.

FIG. 5 illustrates a system comprising two base station sites 501, 502, associated with or connected to a processor 503 comprising at least a scheduler according to some embodiments of the invention. The processor 503 may, for example, be a control unit, a CoMP processor, or a combiner.

FIG. 6 illustrates a base station site 601 comprising at least a scheduler 610 according to some embodiments of the invention.

FIG. 7 illustrates an electronic device (comprising a processing unit 710) and a computer readable medium 720 according to some embodiments of the invention. The electronic device may, for example, be located in, comprising, or associated with a CoMP processor, a combiner, a base station processor, or a scheduler.

According to embodiments of the invention, a user of a terminal may use conventional circuit-switched telecommunication services such as voice calls, data calls, video calls, and fax transmissions, and/or packet-based services such as electronic messaging, VoIP, Internet browsing, electronic commerce, etc. To this end, the mobile terminal and one or more associated base stations and the corresponding communication system may be compliant with at least one mobile telecommunication standard, for instance UMTS or UMTS LTE.

It is noteworthy that embodiments of the invention are not restricted for use in relation to any particular radio access technology (RAT). Contrarily, embodiments of the invention are applicable in any communication system where several terminals are transmitting in the up-link, for example, a WCDMA (Wideband Code Division Multiple Access) system like UMTS/HSPA or an OFDMA (Orthogonal Frequency Division Multiple Access) system like UMTS LTE.

The described embodiments of the invention and their equivalents may be realised in software or hardware or a combination thereof. They may be performed by general-purpose circuits associated with or integral to a processing device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of the invention.

The invention may be embodied within an electronic apparatus comprising circuitry/logic or performing methods according to any of the embodiments of the invention.

The electronic apparatus may, for example, be a CoMP processor, a scheduler or a base station.

According to some embodiments of the invention, a computer program product comprises a computer readable medium such as, for example, a diskette, a USB-stick, a plug-in card or a CD-ROM (compare with FIG. 7). The computer readable medium may have stored thereon a computer program comprising program instructions. The computer program may be loadable into a data-processing unit, which may, for example, be comprised in a CoMP processor, a scheduler or a base station. When loaded into the data-processing unit, the computer program may be stored in a memory associated with or integral to the data-processing unit. According to some embodiments, the computer program may, when loaded into and run by the data-processing unit, cause the data-processing unit to execute method steps according to, for example, the methods shown in any of the FIGS. 2-4.

The invention has been described herein with reference to various embodiments. However, a person skilled in the art would recognize numerous variations to the described embodiments that would still fall within the scope of the invention. For example, the method embodiments described herein describes example methods through method steps being performed in a certain order. However, it is recognized that these sequences of events may take place in another order without departing from the scope of the invention. Furthermore, some method steps may be performed in parallel even though they have been described as being performed in sequence.

In the same manner, it should be noted that in the description of embodiments of the invention, the partition of functional blocks into particular units is by no means limiting to the invention. Contrarily, these partitions are merely examples. Functional blocks described herein as one unit may be split into two or more units. In the same manner, functional blocks that are described herein as being implemented as two or more units may be implemented as a single unit without departing from the scope of the invention.

Hence, it should be understood that the limitations of the described embodiments are merely for illustrative purpose and by no means limiting. Instead, the scope of the invention is defined by the appended claims rather than by the description, and all variations that fall within the range of the claims are intended to be embraced therein.

The invention claimed is:

1. A method of operating a scheduler to schedule up-link transmissions of a first plurality of terminals of a wireless communication system into a second plurality of groups, wherein each group comprises terminals intended for simultaneous up-link transmission during a respective period of time, comprising:
   receiving a respective transmission from each of the first plurality of terminals;
   calculating a subset metric for each subset in a third plurality of subsets of the first plurality of terminals, wherein a size of each subset is less than or equal to the second plurality, and wherein the subset metric is calculated based on the transmissions received from the terminals of the subset and is indicative of a simultaneous transmission suitability measure for the terminals of the subset;
   forming a fourth plurality of subsets from the third plurality of subsets;
   processing each subset in the fourth plurality of subsets in subset metric order, starting with a subset having a subset metric indicating a least suitability of simultaneous transmission among the subsets of the fourth plurality of subsets, by: scheduling each terminal of the subset that is not already scheduled in a group, in a group of the second plurality of groups that does not comprise another terminal of the subset;
   transmitting, to each of the scheduled terminals, an information indicative of the respective period of time during which the scheduled terminal is intended to transmit.

2. The method of claim 1 wherein the subset metric is based at least on a dominant direction of arrival of the transmissions received from the terminals of the subset.

3. The method of claim 2 wherein the subset metric is further based on at least one of:
   a priority of the transmissions from at least one of the terminals of the subset;
   a transmission power of at least one of the terminals of the subset;
   an expected coding rate of at least one of the terminals of the subset;
   a desired quality of service measure of at least one of the terminals of the subset;
   a re-transmission acceptance measure of at least one of the terminals of the subset.

4. The method of claim 1 wherein the subset size is two and the subset metric is a pair-wise metric.

5. The method of claim 4:
   wherein each of the pair of terminals of the subset have a corresponding channel estimate vector;
   wherein the pair-wise metric is based at least on a normalized inner product of the corresponding channel estimate vectors of the terminals of the pair.

6. The method of claim 1:
wherein a size of the fourth plurality equals a predetermined number smaller than the size of the third plurality;
wherein each of the subsets in the fourth plurality of subsets has a subset metric indicating a less suitability of simultaneous transmission than the subset metric of any of the subsets not in the fourth plurality.

7. The method of claim 1:
wherein a size of the fourth plurality is smaller than the size of the third plurality;
wherein the fourth plurality of subsets comprises all subsets having a subset metric that falls on a first side of a simultaneous transmission suitability measure threshold and indicates a less suitability of simultaneous transmission than subset metrics that fall on a second side of the simultaneous transmission suitability measure threshold.

8. The method of claim 1 wherein the step of scheduling each terminal of the subset in a group comprises:
determining, for each group of the second plurality of groups that does not comprise another terminal of the subset, a terminal-specific group metric comprising a subset metric indicating a least suitability of simultaneous transmission among subsets comprising the terminal to be scheduled and terminals already scheduled in the group;
scheduling the terminal in a group having a terminal-specific group metric indicating a most suitability of simultaneous transmission among the terminal-specific group metrics of the groups of the second plurality of groups.

9. A computer program product comprising a non-transitory computer readable medium, having thereon a computer program comprising program instructions, the computer program being loadable into a data-processing unit and adapted to cause the data-processing unit to execute the following steps, for operating a scheduler to schedule up-link transmissions of a first plurality of terminals of a wireless communication system into a second plurality of groups, wherein each group comprises terminals intended for simultaneous up-link transmission during a respective period of time, and a respective transmission from each of the first plurality of terminals is received, when the computer program is run by the data-processing unit, the steps comprising:
calculating a subset metric for each subset in a third plurality of subsets of the first plurality of terminals, wherein a size of each subset is less than or equal to the second plurality, and wherein the subset metric is calculated based on the transmissions received from the terminals of the subset and is indicative of a simultaneous transmission suitability measure for the terminals of the subset;
forming a fourth plurality of subsets from the third plurality of subsets;
processing each subset in the fourth plurality of subsets in subset metric order, starting with the subset having a subset metric indicating a least suitability of simultaneous transmission among the subsets of the fourth plurality of subsets, by: scheduling each terminal of the subset, that is not already scheduled in a group, in a group of the second plurality of groups that does not comprise another terminal of the subset.

10. A scheduler adapted to schedule up-link transmissions of a first plurality of terminals of a wireless communication system into a second plurality of groups, wherein each group comprises terminals intended for simultaneous up-link transmission during a respective period of time, the scheduler comprising one or more processors configured to:
calculate a subset metric for each subset in a third plurality of subsets of the first plurality of terminals, wherein a size of each subset is less than or equal to the second plurality, and wherein the subset metric is calculated based on respective transmissions received from each of the terminals of the subset and is indicative of a simultaneous transmission suitability measure for the terminals of the subset;
form a fourth plurality of subsets from the third plurality of subsets;
process each subset in the fourth plurality of subsets in subset metric order, starting with a subset having a subset metric indicating a least suitability of simultaneous transmission among the subsets of the fourth plurality of subsets, by: scheduling each terminal of the subset, that is not already scheduled in a group, in a group of the second plurality of groups that does not comprise another terminal of the subset.

11. The scheduler of claim 10 wherein the one or more processors are configured to base the subset metric at least on a dominant direction of arrival of the transmissions received from the terminals of the subset.

12. The scheduler of claim 10 wherein the subset size is two and the subset metric is a pair-wise metric.

13. The scheduler of claim 10 wherein the one or more processors are configured to schedule each terminal of the subset in a group by:
determining, for each group of the second plurality of groups that does not comprise another terminal of the subset, a terminal-specific group metric comprising a subset metric indicating a least suitability of simultaneous transmission among subsets comprising the terminal to be scheduled and terminals already scheduled in the group;
scheduling the terminal in a group having a terminal-specific group metric indicating a most suitability of simultaneous transmission among the determined terminal-specific group metrics.

14. A wireless communication system, comprising:
a scheduler adapted to schedule up-link transmissions of a first plurality of terminals of a wireless communication system into a second plurality of groups, wherein each group comprises terminals intended for simultaneous up-link transmission during a respective period of time, the scheduler comprising one or more processors configured to:
calculate a subset metric for each subset in a third plurality of subsets of the first plurality of terminals, wherein a size of each subset is less than or equal to the second plurality, and wherein the subset metric is calculated based on respective transmissions received from each of the terminals of the subset and is indicative of a simultaneous transmission suitability measure for the terminals of the subset;
form a fourth plurality of subsets from the third plurality of subsets;
process each subset in the fourth plurality of subsets in subset metric order, starting with a subset having a subset metric indicating a least suitability of simultaneous transmission among the subsets of the fourth plurality of subsets, by: scheduling each terminal of the subset, that is not already scheduled in a group, in a group of the second plurality of groups that does not comprise another terminal of the subset;
at least one receiver adapted to receive the respective transmissions from each of the first plurality of terminals;

a transmitter adapted to transmit, to each of the scheduled terminals, an information indicative of the respective period of time during which the scheduled terminal is intended to transmit.

15. A computer program product comprising a non-transitory computer readable medium having thereon a computer program comprising program instructions, the computer program being loadable into a data-processing unit and adapted to cause the data-processing unit to execute, when the computer program is run by the data-processing unit, the steps of:

receiving a respective transmission from each of the first plurality of terminals;

calculating a subset metric for each subset in a third plurality of subsets of the first plurality of terminals, wherein a size of each subset is less than or equal to the second plurality, and wherein the subset metric is calculated based on the transmissions received from the terminals of the subset and is indicative of a simultaneous transmission suitability measure for the terminals of the subset;

forming a fourth plurality of subsets from the third plurality of subsets;

processing each subset in the fourth plurality of subsets in subset metric order, starting with a subset having a subset metric indicating a least suitability of simultaneous transmission among the subsets of the fourth plurality of subsets, by: scheduling each terminal of the subset that is not already scheduled in a group, in a group of the second plurality of groups that does not comprise another terminal of the subset;

transmitting, to each of the scheduled terminals, an information indicative of the respective period of time during which the scheduled terminal is intended to transmit.

\* \* \* \* \*